Figure 1:
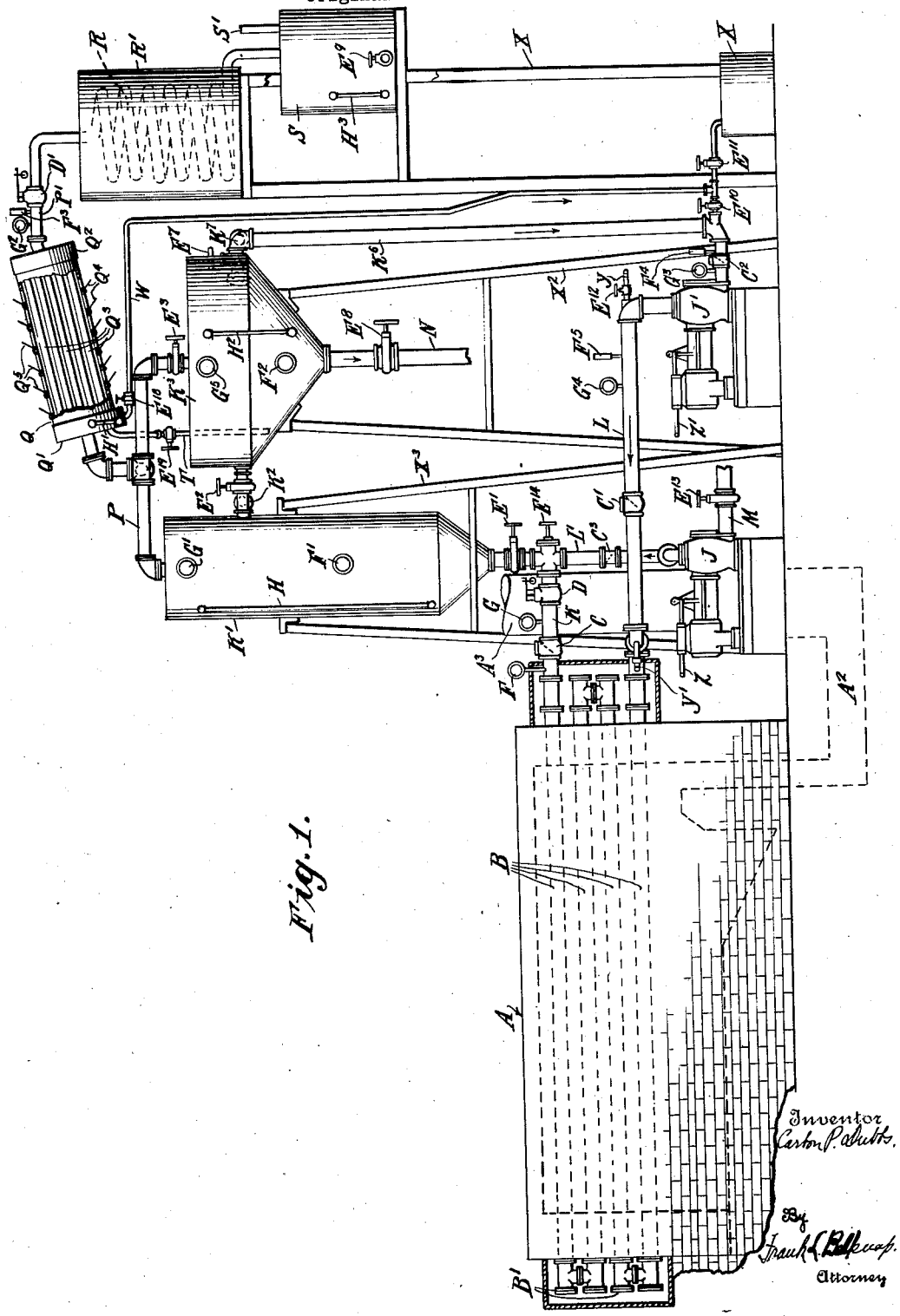

April 21, 1925.

C. P. DUBBS 1,534,927

METHOD FOR TREATING HYDROCARBON OILS

Original Filed Dec. 21, 1917    2 Sheets-Sheet 1

April 21, 1925.
C. P. DUBBS
1,534,927
METHOD FOR TREATING HYDROCARBON OILS
Original Filed Dec. 21, 1917   2 Sheets-Sheet 2
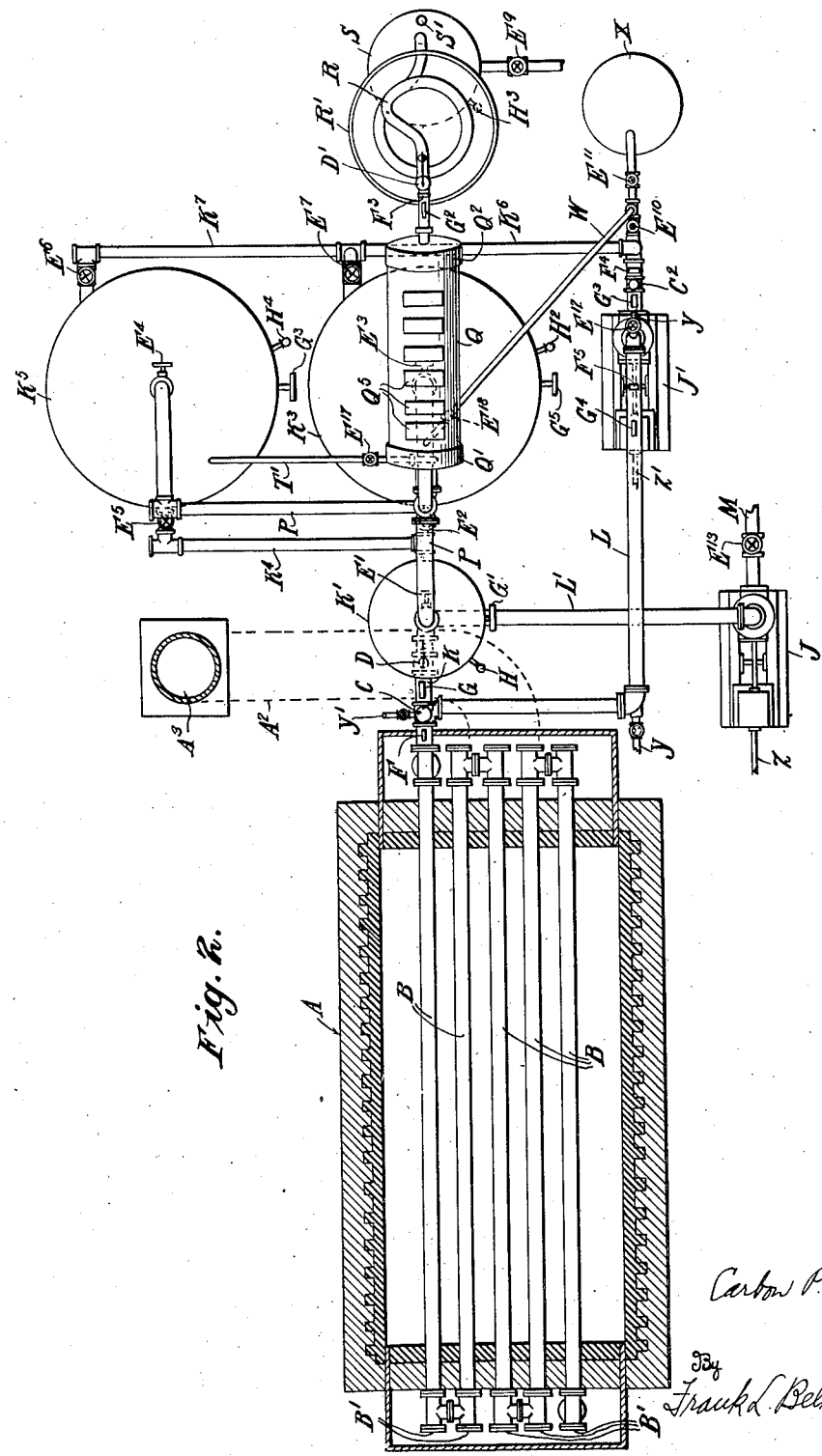

Patented Apr. 21, 1925.

1,534,927

UNITED STATES PATENT OFFICE.

CARBON P. DUBBS, OF WILMETTE, ILLINOIS, ASSIGNOR TO THE UNIVERSAL OIL PRODUCTS COMPANY, OF CHICAGO, ILLINOIS, A CORPORATION OF SOUTH DAKOTA.

METHOD FOR TREATING HYDROCARBON OILS.

Continuation of application Serial No. 208,206, filed December 21, 1917. This application filed October 20, 1922. Serial No. 595,743.

*To all whom it may concern:*

Be it known that I, CARBON P. DUBBS, a citizen of the United States, now residing in the city of Wilmette, county of Cook, and State of Illinois, have invented certain new and useful Improvements in Methods for Treating Hydrocarbon Oils, of which the following is a specification.

This invention relates to a method for treating hydrocarbon oils to produce therefrom products having lower boiling points.

My invention contemplates, among other things, a method whereby crude petroleum, petroleum distillates, petroleum residuum, or mixtures thereof is passed through the apparatus and more or less converted to lower boiling point products; other objects of my invention are; to provide a process for heating oils in coils while maintaining the oil under definitely controlled velocity and temperatures, then passing the heated oil to an upright tank and from there into a settling tank and then back through the same heating coils; to provide a process for continuously treating petroleum for production of lower boiling point products; to provide a process for automatically condensing the heavy vapors and returning same for further treatment; to provide a means whereby either water, in the shape of water or steam or both can be injected into the oil while undergoing treatment; to provide a process whereby any water condensed in the reflux condenser is automaticaliv trapped and either automatically returned to the heating coils or withdrawn from the system; to provide a process for holding a higher pressure upon the oil while same is circulated through the heating tubes and holding a lower pressure on the upright and settling tanks or oil receiving means and reflux condenser; to provide a process for rapid circulation of oil in heating coils and relatively slow circulation in the settling tank; to provide a means of continuously feeding raw material and continuously taking off lower boiling point products and also for continuously taking off the residuum containing more or less free carbon; to provide a process to prevent the free carbon or other solids from settling on the walls of the heating tubes; to provide a process whereby the forced circulation in a continuous coil creates a pressure on the oil in excess of that maintained on the rest of the apparatus whereby the oil in said coil can be subjected to a higher heat without being converted, to any great amount, into vapors, and said oil is passed into a chamber of lower pressure. The boiling point of said heated oil is thereby lowered and more or less of same thus converted into vapors; to provide a process whereby the oil while being heated is maintained at a relatively high velocity and then passed in a much larger stream through a settling tank and owing to this stream being much larger its velocity has been greatly reduced which will cause the excess carbon held in the oil to be precipitated out; to provide a process whereby the length of time the oil being treated is subjected to heat during any one time is under full control; to provide a process whereby the amount of heavy vapors condensed and returned for further treatment is controlled; to provide a process for maintaining the interior surface of the tubes in a smooth highly polished condition by means of passing the oil through same at a high velocity; to provide a process for frequently relieving the oil in the heating tubes of its vapor contents; to provide a process for bringing part of the residuum to a quiescent state and allowing the free carbon or other solids to settle and withdrawing same and returning the settled residuum back into the circulation for further treatment; to provide, in general, a process and apparatus of the character referred to.

This application is a continuation of my copending application No. 208,206, filed December 21, 1917.

In the drawings, Fig. 1 is a side elevation of the apparatus, partly in section and partly broken away. Fig. 2 is a plan view of the apparatus, with parts in section.

Referring to the drawings:—A is the furnace in which the heating tubes B are positioned. $A^2$ is a flue tunnel connecting said furnace to stack marked $A^3$. $B^1$ are return connections on the ends of the tubes B and on these return connections, positioned on the end of each tube are flanges which may be readily removed and the interior of each of the tubes be examined and cleaned.

C, C$^1$, C$^2$, C$^3$, are check valves positioned on the different lines.

D, and D$^1$ are pressure regulating valves.

E$^1$ to E$^{14}$ inclusive and E$^{17}$, E$^{18}$ and E$^{19}$ are throttle valves.

F, F$^1$, F$^2$, F$^3$, F$^4$ and F$^5$ are pyrometers.

G, G$^1$, to G$^6$ inclusive are pressure gauges.

H, H$^1$, H$^2$, H$^3$, H$^4$ are glass liquid gauges.

J, J$^1$ are steam pumps; K is the discharge line from the heating coil B to the tank K$^1$. K$^2$ is the overflow from tank K$^1$ to tank K$^3$, and connected with K$^2$ is line K$^4$ to tank K$^5$ having positioned on it valve E$^5$. K$^6$ is suction line connecting pump J$^1$ to tank K$^3$ and connecting with suction line K$^6$ is suction line K$^7$ connecting it with tank K$^5$ and on these two suction lines are positioned valves E$^6$ and E$^7$.

L is discharge line from pump J$^1$ to the heating tubes B and L$^1$ is the discharge line from pump J to tank K$^1$.

M is the suction line to pump J. N is the drawoff from the bottom of tank K$^3$, a similar one being positioned on the bottom of tank K$^5$.

P are the vapor lines from tanks K$^1$, K$^3$ and K$^5$ leading to a reflux air condenser Q.

Q$^1$ is a header on the lower end of the air condenser and Q$^2$ is a header on the upper end of this condenser which are connected by the slanting tubes Q$^3$, and out of the header Q$^2$ extends vapor line P$^1$ connecting with condensing coils R positioned in the water cooling tank R$^1$ and extending into the top of tank S and extending out of the top of tank S is gas line S$^1$. Q$^4$ and Q$^5$ are doors in the housing surrounding the tubes Q$^3$ of the reflux air condenser Q, these doors being for the purpose of controlling the amount of air circulated around the tubes Q$^3$.

T is a line extending from the end of the header Q$^1$ into the tank K$^3$ with branch T$^1$ extending to tank K$^5$.

W is a line extending from the bottom of the header Q$^1$ into the bottom of the suction line K$^6$ or can be drained into the tank X. X$^1$, X$^2$ and X$^3$ are supports for the different parts of the apparatus.

Y is a line entering the discharge pipe L through which steam or water or both are injected from any suitable source of supply. Y$^1$ being another line for a similar purpose. Z and Z$^1$ are steam lines to pumps J and J$^1$.

Now describing the operation of the process, the material to be treated is drawn from any suitable source of supply through line M, through pump J, through line L$^1$ into the different parts of the apparatus until the proper amount of the material to be treated has been charged into the said apparatus, which amount should be sufficient to fill the heating tubes B, and tank K$^1$ to overflow into tank K$^3$ and tank K$^5$ to overflow suction line K$^6$ so that suction line K$^6$ will always be covered while pump J$^1$ is in operation. Pump J is then shut down for the time being and pump J$^1$ is put into operation and by this means the oil is circulated through discharge line L into and through the heating tubes B then through line K into and through tank K$^1$ to overflow K$^2$ into and through tank K$^3$ and then to overflow suction K$^6$, into and through pump J$^1$ and so on as above described. Fire is placed in the furnace A and maintained at a proper temperature, which temperature will range from 400 to 2400° F. The specific temperature that will be used in any one case will depend on many things, such as the volume of oil treated in any given period of time also on the velocity at which the oil is passed through the heating tubes B also on the character of material being treated.

As the oil passes through the heating tubes B it is subjected to the proper heating and then is passed up through the oil contained in the tank K$^1$ and the vapors liberated in this tank pass out through the vapor lines P while the oil overflows from tank K$^1$ through overflow pipe K$^2$ into tank K$^3$ and the vapors liberated while the oil is passing through tank K$^3$ pass up through the vapor line P into the header Q$^1$ through air cooled tubes Q$^3$ and into header Q$^2$ and from there through pressure valve D$^1$ through condensing coils R into receiving tank S from which the distillate is drawn either continuously or intermittently through valve E$^9$, while the uncondensable gas is drawn off through line S$^1$. K$^5$ is a tank similar in detail to tank K$^3$, and is so connected with the apparatus by means of overflow pipe K$^4$ and overflow suction pipe K$^7$ and vapor lines P$^2$, that either or both of these tanks can be used or either be cut out and cleaned while the other is in use and the apparatus maintained in operation. For instance tank K$^3$ can be cut out of the apparatus by the closing of the valves E$^2$, E$^7$, E$^3$ and E$^{19}$ which will cut out the tank K$^3$ and by opening valves E$^5$, E$^4$, E$^6$ and E$^{17}$ will put in commission the tank K$^5$ and the tank K$^3$ can then be cleaned; and reversing the opening and shutting of the above mentioned valves will put tank K$^3$ back in operation and cut out tank K$^5$. The vapors condensed in the header Q$^2$ and the connecting pipes Q$^3$ and header Q$^1$ will flow into the header Q$^1$ and then be drained back into tank K$^3$ or tank K$^5$ according to which is in operation, and any water condensed along with this distillate will be collected in header Q$^1$ and can be drawn off through line W into tank X by the closing of valve E$^{10}$ and the opening of valve E$^{11}$ or it may be returned to the apparatus into the bottom of suction line K$^6$ by opening valve E$^{10}$ and closing E$^{11}$, or the distillate collected in Q$^1$ may be handled in the same way. As the oil passes through tank K³ or tank K⁵ and while the volume passing through this tank in any given space of time, is as great as the oil passed through the heating tubes B in the same given time, yet the mass movement in the tank K³ or tank K⁵ will be so much slower that the oil will not be able to carry in suspension the amount of free carbon or other solids that it was able to carry in suspension while passing through the heating tubes B, and therefore this excess carbon or other solids will settle out in said tank K³ or tank K⁵ and be drawn off with the residuum through line N and which residuum can be drawn off either intermittently or continuously, or no residuum at all is drawn off and the free carbon and other solids allowed to collect in the bottom of the tanks K³ or K⁵, and when an accumulation has been attained in either of these tanks, that particular tank can be cut out from the apparatus, as already described, and the said tank be cleaned and then be put into operation and in the meantime the free carbon and other solids will accumulate in the other tank in the same manner. A fresh supply of raw material may be fed either continuously or intermittently into the apparatus through line M through pump J, through discharge line L¹ into the bottom of tank K¹. It will be observed that the incoming charging stock passes into the tank K¹, and then into either the tanks K³ or K⁵, thereby absorbing some of the heat of the oil for the purpose of preheating the charging stock and perhaps also vaporizing out low boiling point ends. Steam or water or both may be fed into the apparatus through line Y into discharge line L either continuously or intermittently.

The higher the velocity at which the oil is circulated through the heating tubes B, the higher will be the additional pressure on such oil while in said tubes over and above such pressure maintained on the rest of the apparatus, and in order to increase the pressure above that additional pressure that will be created on the oil by the velocity that it is desired to maintain the oil at in the heating tubes, I have placed a pressure regulating valve on the discharge line of these tubes and marked it D.

It will be seen that my method herein described, permits of the continuous treatment of petroleum wherein such petroleum is repeatedly subjected to a heating zone under a higher pressure than is maintained elsewhere on the apparatus, such heated oil repeatedly percolated up through a body of oil, repeatedly passed through a settling tank, and while passing through the latter two places the oil freed of its vapor contents which pass up in a reflux condenser wherein the heavy vapors are condensed and automatically returned to the apparatus while the remaining vapors pass on through the water cooled condenser and are collected separately, while the remaining unvaporized oil and condensate from the reflux condenser are again subjected to further heat treatment. It will also be seen that by my herein described method the distillates from the reflux condenser can be returned to the oil in the settling tank or returned practically direct to the suction side of the circulation pump. It will further be seen that by my method herein described I can use either water or steam or both in the heating tubes and such water condensed in the reflux condenser, trapped and withdrawn from the apparatus or automatically returned back to the heating tubes. It will also be seen by my herein described method that I can distill practically all the oil put into the apparatus without withdrawing from the apparatus any substantial amount of liquid residue, but continue to feed fresh raw material into the apparatus and yet not plug my heating tubes with carbon. It will also be seen that by my method herein described the grade of final distillate allowed to pass from the process is definitely controlled by means of the reflux condenser.

The pressure that can be used on the apparatus will vary from atmospheric to 1,000 lbs. per square inch, but in all cases the pressure on the oil while passing through the heating tubes will be more than the pressure maintained on the rest of the apparatus, and where such rest of the apparatus is over the pressure of one atmosphere, then such pressure is reduced to atmospheric pressure at D¹. It will be understood that the pressure maintained on the apparatus will be governed by the boiling point of the products produced, and the quantity produced, and the temperature to which the oil is subjected in the heating tubes and whether heated in connection with water or steam or both, and these will vary according to the raw material used, all of which are of very considerable commercial value. In the method and apparatus here shown it will be noted that the condensation of the final product in the water condensing and receiving tank takes place at atmospheric pressure.

It will be understood that while I herewith furnish drawings and describe a certain apparatus, yet I do not limit myself to any particular construction of apparatus or arrangement of same.

The heating coils B are from 2″ to 4″ in diameter. The tank K¹ is approximately 3′ in diameter and 10′ high. The settling tanks K³ and K⁵ are 10′ in diameter more or less. Charging the heating tubes with gas oil from the mid continent field, having a gravity of about 32° to 34° Baumé, and subjecting the same to a heat of approximately 850° in the heating tubes and discharging the cracked oil therefrom to K¹, a yield of 50% to 60% low boiling point distillate may be obtained, it being understood that the system is maintained under a pressure of from 100 lbs. to 150 lbs. By redistillation of this condensate, about 50% low boiling point hydrocarbon oils having a boiling point of approximately 400° F. may be obtained.

Having thus described my invention, what I claim is:

1. A process for cracking oil, comprising subjecting a stream of oil in a tube to a cracking temperature under a pressure exceeding atmospheric, in discharging the oil into an enlarged zone, in stepping down the pressure on the oil in said zone to a pressure substantially lower than the pressure maintained on the oil stream but above atmospheric, in subjecting generated vapors to reflux condensation, in returning reflux condensate to said enlarged zone, in introducing under an applied pressure reflux condensate and light unvaporized oil from the enlarged zone to said tube to pass in a stream therethrough, in withdrawing during the operation of the system heavy carbon containing residuum from the enlarged zone, and in supplying charging stock to the system during operation.

2. A process for cracking oil, comprising passing a stream of oil in a tube through a heating zone to be heated to a cracking temperature while maintained under a superatmospheric pressure, in transferring the oil to an enlarged zone where a body of the oil is maintained, in stepping down the pressure on said oil body to a pressure substantially lower than the pressure maintained on the oil stream but above atmospheric, in subjecting generated vapors to reflux condensation, in passing lighter unvaporized oil from said body to the heating tube, in returning reflux condensate to the heating tube, in discharging heavy carbon containing residuum from the oil body during the conversion of oil in the system, in introducing charging stock to the system during operation thereof.

3. A process for cracking hydrocarbon oil, comprising passing a stream of oil through a heating zone to be subjected to a cracking temperature while maintained under a pressure exceeding atmospheric, in transferring the oil to an enlarged zone, in reducing the pressure maintained on the oil in said enlarged zone to a pressure substantially lower than the pressure maintained on the oil stream but above atmospheric, in subjecting generated vapors to reflux condensation, in returning reflux condensate to the heating zone to pass in a stream therethrough, in discharging carbon containing residual oil from the enlarged zone during the operation of the process without again admitting the same to the stream of oil passing through the heating zone, in supplying substantially continuously charging stock to the system, and in discharging uncondensed vapors after reflux condensation for final condensation and collection.

4. A process for cracking hydrocarbon oil, consisting in passing a stream of oil through a heating coil to be subjected to a cracking temperature while under a pressure exceeding atmospheric, in transferring the oil to an enlarged zone where a body of oil is maintained, in substantially reducing the pressure on the oil in said enlarged zone to a pressure substantially lower than the pressure maintained in the heating coil but above atmospheric, in subjecting generated vapors to reflux condensation, in retreating the reflux condensate by passing the same through the heating coil, in introducing charging stock to the system, and in discharging heavy carbon containing residuum from said enlarged zone during the conversion of oil therein without again admitting the same to the heating coil.

5. A process of oil conversion, comprising passing a stream of oil through a tube in a heating zone to be subjected to a cracking temperature, in transferring the oil to an enlarged zone where a pool of oil is maintained, in subjecting vapors generated from the oil in said pool to reflux condensation, in withdrawing from said oil pool at one level unvaporized oil for repassage through the heating tube, and in withdrawing from the oil pool at a lower level carbon containing residuum without again admitting the same to the heating tube, in forcing the first mentioned withdrawn oil with reflux condensate under an applied pressure through the heating tube, in continuously introducing charging stock to the system during the conversion of oil therein, and in maintaining a superatmospheric pressure on the oil undergoing conversion and on the vapors passing through the reflux condenser.

6. A process for converting oil, comprising passing a stream of oil through a tube in a heating zone to be subjected to a cracking temperature, in transferring the oil to an enlarged zone where vaporization takes place, removing vapors from said zone and subjecting them to reflux condensation, in returning reflux condensate after such condensation and also unvaporized light oil from the enlarged zone to the heating tube for retreatment, in discharging carbon containing residual oil from said enlarged zone during the operation of the process, in introducing charging stock continuously to said system, and during the operation of the system maintaining the stream of oil in the heating tube and the oil in the enlarged zone under a pressure substantially above atmospheric while subjecting the vapors when undergoing reflux condensation to a pressure substantially lower than the pressure maintained on the oil stream but above atmospheric.

7. A process of oil conversion, comprising passing a stream of oil through a tube in a heating zone to be subjected to a cracking temperature, in transferring the oil to an enlarged zone where a body of oil is maintained, subjecting vapors generated from said oil to reflux condensation, in returning reflux condensate to the enlarged zone, in returning unvaporized oil from said enlarged zone and reflux condensate to the heating tube to pass in a stream therethrough for retreatment, in withdrawing heavy carbon containing oil from said enlarged zone, in introducing charging stock to said system during the conversion of oil therein, and in maintaining a superatmospheric pressure on the oil stream in said tube and on the oil in said enlarged zone.

8. A process of oil conversion, comprising passing a stream of oil through a tube in a heating zone to be heated to a cracking temperature, in transferring the heated oil to an enlarged zone where a pool of oil is maintained, in subjecting oil vapors from said pool to reflux condensation, in returning reflux condensate to the heating tube, in withdrawing light unvaporized oil from said oil pool, and in forcing the same through the heating tube under mechanical pressure, in withdrawing heavier carbon containing residual oil from the oil pool without again admitting the same to the heating tube, in introducing charging stock to said system during the conversion of oil therein, and in maintaining a superatmospheric pressure on the oil in said heating tube and on the pool of oil in said enlarged zone.

9. A process for converting oil, consisting in passing a stream of oil through a heating zone to be subjected to a cracking temperature, in maintaining a superatmospheric pressure on said oil stream, in transferring the heated oil to an enlarged zone, in stepping down the pressure maintained in said enlarged zone below still pressure but above atmospheric, in subjecting generated vapors to reflux condensation, in returning reflux condensate to the oil stream to pass with the oil in said stream under an applied mechanical pressure to the inlet of the heating zone, in continuously supplying charging stock to the system, in withdrawing heavy carbon containing residual oil from the enlarged zone during conversion of the oil therein without admitting the same to the heating zone, and in subjecting vapors after reflux condensation to final condensation.

10. The process for cracking oil, consisting in passing a stream of oil through a heating zone where said oil is subjected to a cracking temperature, in passing the heated oil to an enlarged chamber, in removing vapors generated from said oil and subjecting them to reflux condensation where the heavier vapors are condensed and returned to the heating zone for retreatment, in supplying charging stock to the system, and during the operation of the system maintaining the stream of oil in the heating zone and the oil in said enlarged zone under a pressure above atmospheric while maintaining the oil vapors during reflux condensation under a pressure substantially lower than the pressure maintained on the oil stream.

11. An oil conversion process, comprising heating a stream of oil passing through a restricted tube to a cracking temperature, in transferring the oil to an enlarged zone where conversion occurs and where a pool of oil is maintained, in subjecting generated vapors to reflux condensation, in preventing the return of heavy carbon containing residual oil from said enlarged zone to the oil stream, in preheating charging stock by heat absorbed from the oil in the enlarged zone, in feeding a substantial portion of the preheated charging stock to said tube in the heating zone with reflux condensate obtained from the reflux condensation of said oil vapors, in discharging uncondensed vapors after such condensation, and in maintaining a superatmospheric pressure on the oil stream and on the oil in the enlarged zone.

12. A process of oil conversion, comprising passing a stream of oil through a tube in a heating zone to be subjected to a cracking temperature, in transferring the oil to an enlarged zone where a pool of oil is maintained, in subjecting vapors generated from said oil pool to reflux condensation, in returning reflux condensate to the enlarged zone containing said oil pool, in withdrawing light unvaporized oil and reflux condensate from said oil pool at one level, in forcing said withdrawn oil and reflux condensate through the heating tube under pressure, in withdrawing from the pool of oil at a lower level heavier carbon containing oil without again admitting the same to the heating tube, in introducing charging stock to the system during the conversion of oil therein, and in maintaining a superatmospheric pressure on the oil in said tube in the heating zone and on the pool of oil maintained in said enlarged zone.

13. An oil conversion process, consisting in passing a stream of oil through a heating zone where said oil receives its cracking heat, in collecting the oil in a plurality of serially communicating pools where conversion occurs, in subjecting vapors generated from said converted oil to reflux condensation, in passing the reflux condensate through said heating zone for retreatment, in discharging heavy carbon containing residuum continuously from said system without admitting the same to the oil stream, in discharging uncondensed vapors after reflux condensation to a final condenser, and in maintaining a superatmospheric pressure on the oil in said stream and on said enlarged oil body undergoing conversion while subjecting the vapors undergoing reflux condensation to a pressure substantially lower than the pressure maintained on the oil stream but above atmospheric.

14. The process of oil conversion, consisting in passing a stream of oil through a heating zone where said oil is subjected to a cracking temperature, in transferring the oil to an enlarged zone where conversion occurs, in subjecting vapors generated from said oil to reflux condensation where the heavier vapors are condensed and returned for passage in the oil stream through the heating zone for retreatment, in continuously supplying charging stock to said system, in withdrawing heavy carbon containing residual oil from the system without again admitting the same to the oil stream and during the operation of the system maintaining the stream of oil in the heating zone and the oil in said enlarged zone under a pressure substantially exceeding atmospheric, while subjecting the oil vapors undergoing reflux condensation to a pressure above atmospheric but substantially lower than the pressure maintained on the oil stream.

15. A process for cracking oil consisting in passing a stream of oil through a heating zone where the oil is heated to a cracking temperature, in delivering the highly heated hydrocarbon to an enlarged zone, in subjecting vapors produced from the oil to reflux condensation, in returning reflux condensate to the heating zone for retreatment while preventing the return of heavy carbon containing residual oil thereto and during the operation maintaining the stream of oil in the heating zone and the oil in the enlarged chamber under a pressure substantially above atmospheric, while maintaining the oil vapors during reflux condensation under a substantially lower pressure than the pressure maintained on the oil stream, but above atmospheric.

CARBON P. DUBBS.